(12) United States Patent
Gastel

(10) Patent No.: US 8,518,839 B2
(45) Date of Patent: Aug. 27, 2013

(54) PEELABLE SHIM HAVING A THICKNESS THAT CAN BE ADJUSTED BY EXFOLIATING

(76) Inventor: Daniel André Gastel, Plaisir les Gatines (FR)

(*) Notice: Subject to any disclaimer, the term of this patent is extended or adjusted under 35 U.S.C. 154(b) by 116 days.

(21) Appl. No.: 10/492,611

(22) PCT Filed: Sep. 16, 2002

(86) PCT No.: PCT/FR02/03154
§ 371 (c)(1),
(2), (4) Date: Sep. 8, 2004

(87) PCT Pub. No.: WO03/039854
PCT Pub. Date: May 15, 2003

(65) Prior Publication Data
US 2005/0079782 A1 Apr. 14, 2005

(30) Foreign Application Priority Data
Oct. 19, 2001 (FR) ..................... 01 13515

(51) Int. Cl.
*B32B 7/12* (2006.01)
*B32B 7/04* (2006.01)
*B32B 7/06* (2006.01)
*B32B 5/02* (2006.01)

(52) U.S. Cl.
USPC .......... 442/152; 442/155; 442/156; 442/172; 442/175; 442/180; 428/343; 428/354; 428/355 RA; 428/355 EP; 428/349; 428/411.1; 384/604; 384/626; 403/390; 403/365; 403/369; 403/135; 403/243; 403/351

(58) Field of Classification Search
USPC ....... 442/251, 252, 253; 384/626; 428/316.6
See application file for complete search history.

(56) References Cited

U.S. PATENT DOCUMENTS 1,365,291 A * 1/1921 Gray et al. ............ 384/626
1,951,730 A * 3/1934 Johnson ............... 384/626
(Continued)

FOREIGN PATENT DOCUMENTS

| EP | 0667233 | 8/1995 |
| EP | 1 284 224 A1 * | 2/2003 |
| JP | 07-156172 | 6/1995 |
| WO | WO 01/61101 A1 * | 8/2001 |

OTHER PUBLICATIONS

Petrie, E.M. (2000). Handbook of Adhesives and Sealants. (pp. 322). McGraw-Hill.Online version available at:http://www.knovel.com/knovel2/Toc.jsp?BookID=610&VerticalID=0.*
Petrie, Edward M., Handbook of Adhesives and Sealants, 2000, McGraw-Hill, Chapter 9, p. 322.*

(Continued)

*Primary Examiner* — Gerard Higgins
*Assistant Examiner* — Anish Desai
(74) *Attorney, Agent, or Firm* — Ladas & Parry LLP

(57) ABSTRACT

The invention relates to a rolled product having a thickness that can be adjusted by means of separation. The inventive product comprises an alternating stack (2) of sheets (4) and layers (6) of an adhesive material (8). Each of said sheets (4) has an intrinsic resistance to tearing and each layer (6) of adhesive material (8) joins together two adjacent sheets (4) in the stack (2) using a bond strength that is lower than the tearing resistance of the sheets (4). In this way, each sheet (4) can be detached from the stack (2) without being torn. According to the invention, each sheet (4) is essentially made from woven fibers and each sheet (4) belonging to each pair of sheets (4) which are adjacent to the same layer (6) of adhesive material (8) is impregnated, throughout the thickness thereof, with a mass of adhesive material (8) which is incorporated in the shared layer (6) of adhesive material (8).

9 Claims, 1 Drawing Sheet

(56) References Cited

U.S. PATENT DOCUMENTS

| | | | | |
|---|---|---|---|---|
| 2,106,385 | A | * | 1/1938 | Springer .................... 428/105 |
| 3,844,822 | A | * | 10/1974 | Boss et al. .................... 427/377 |
| 4,263,243 | A | | 4/1981 | Wilson et al. |
| 4,412,854 | A | | 11/1983 | Layden |
| 4,428,998 | A | * | 1/1984 | Hawkinson .................... 442/263 |
| 4,526,641 | A | | 7/1985 | Schriever et al. |
| 4,820,568 | A | * | 4/1989 | Harpell et al. .................... 428/113 |
| 5,244,719 | A | * | 9/1993 | Qureshi et al. .................... 442/175 |
| 5,514,448 | A | | 5/1996 | Sakai et al. |
| 6,803,095 | B1 | * | 10/2004 | Halladay et al. .................... 428/292.1 |
| 2003/0162884 | A1 | * | 8/2003 | Kawaguchi .................... 524/494 |

OTHER PUBLICATIONS

Derwent Abstract of JP02-008522A, "Shim prodn. for disk brakes—by impregnating inorganic woven fabric with inorganic binder and drying or heat-treating." Jan. 12, 1990.*

Noyuki, Hashimoto et al., "Shim for Disk Brakes", English translation of JP 02-008522, Jan. 12, 1990.*

Gastel Daniel, "Binder materrial preferably associated with a polymer film, its application to the manufacture of peelable nonmetallic laminated composite products and new peelable nonmetallic laminated composite prod[uct]", abstract of FR 002572411A1.*

* cited by examiner

PEELABLE SHIM HAVING A THICKNESS THAT CAN BE ADJUSTED BY EXFOLIATING

The present invention, in general, involves laminated products whose thickness can be adjusted by exfoliation, as well as the manufacturing processes for such products and their application as shims for mechanical assemblies.

More specifically, the invention involves first of all a laminated product featuring a thickness that can be adjusted by exfoliation, where this product features alternating layering of sheets and layers of an adhesive material, where each sheet has an intrinsic resistance to tearing, and each layer of adhesive material connects two sheets adjacent to each other in the pile by an associative force that is weaker than the resistance of the sheets to tearing, so that each sheet can be detached from the stack without being torn.

These materials, called "peelable" materials, are widely used as thickness shims in complex mechanical assemblies, in particular aeronautical assemblies. These assemblies may consist of several hundred or even thousands of parts, each of which has its own dimensional tolerances. The sum total of the tolerances creates play which can in some cases be considerable, several millimeters, for which it is necessary to compensate in order to assure correct functioning of mechanical assemblies.

To this end, shims are used, which are most often peelable, of metallic or polymeric materials. These peelable, shims are composed of thin laminates that are stacked with glue between them to a greater or lesser thickness, and machined so as to adapt to the outer contour of the items to be adjusted. Adjustment is carried out through reduction in the thickness of the shim by peeling off one or more of these laminates and inserting the shim in the place where play was determined to exist.

The latest mechanical technologies, notably for airplanes or helicopters, progressively incorporate materials that consist of fabrics made of fiberglass, carbon, ceramic or aramid fibers to create significant mechanical components for devices. For some helicopters, 40% of the mass of the device consists of this type of material.

At present, no peelable shim exists that is made of materials of this type. Modern peelable polymers are smooth films, and even thought they may include a small mineral component, preferably consisting of fiberglass, they belong to the family of plastics by their limited mechanical-and thermal characteristics, which are much lower than what can be expected from fiber fabrics like those noted above.

Consequently, manufacturers must provide for adjustment by machining, directly on mechanical parts, which is very costly during manufacture and even more so during maintenance, or use peelable metallic or polymeric materials in the case where mechanical constraints are not too high. Still, in the latter case, a risk exists of premature wear of parts by abrasion when combining materials of different types.

In this context, the first goal of the invention is to propose a laminated product which palliates the difficulties described above.

To this end, the product according to the invention, which is moreover in compliance with the generic definition given in the preamble above, is essentially distinguished by the fact that each sheet consists essentially of woven fibers, and by the fact that each sheet of each pair of sheets adjacent to the same common layer of adhesive material is impregnated throughout its thickness with a mass of adhesive material, which becomes incorporated into the layer that is common to the adhesive material.

In one manner of embodiment of the product according to the invention, the adhesive material is a resin, for example of the epoxy, phenolic, vinyl-ester or polyvinylic type, where the sheets are united by a polymerization process.

According to one favorable aspect of the product according to the invention, the adhesive material may represent 40% to 60% of the volume of the product before the polymerization process.

According to one favorable aspect of the product according to the invention, the additives may be added to the resin so as to form the adhesive material, where these additives are hardeners and/or diluents designed to modify the viscosity of the adhesive material.

According to one favorable aspect of the product according to the invention, adherence of adjacent sheets to each other can be decreased by increasing the quantity of diluent in proportion to the quantity of resin in the adhesive material.

According to one favorable aspect of the product according to the invention, the additive may represent more than 50% by volume of the adhesive material before the polymerization process.

According to one favorable aspect of the product according to the invention, the fibers in the sheets may be essentially glass, carbon, ceramic or aramid fibers, or a mixture of these latter.

According to a second aspect, the invention involves a fabrication process of a rolled product featuring a thickness that can be adjusted by peeling, this process consists of a stacking operation which consists of forming a stack by alternating sheets and layers of an adhesive material.

The process according to the invention, which is moreover in compliance with the generic definition given in the preamble above, is essentially distinguished by the fact that it consists, prior to the stacking process, of operations consisting of choosing the -fabric of woven fibers for the sheet, and of impregnating throughout its thickness each sheet of an adhesive material, each layer of adhesive material arranged between two adjacent sheets, which are formed by joining of the adhesive material that impregnates one of the adjacent sheets, by the adhesive material impregnating the other adjacent sheet.

In one possible manner of embodiment of the procedure according to the invention, the adhesive material is a resin, for example of the epoxy, phenolic, vinyl-ester or polyvinylic type.

According to one favorable aspect of the process according to the invention, the adhesive material may represent from 40% to 60% of the volume of the sheet after impregnation.

According to one favorable aspect of the process according to the invention, additives may be added to the resin to make the adhesive material, where these additives are hardeners and/or diluents intended to modify the viscosity of the adhesive material.

According to one favorable aspect of the process according to the invention, the fibers in the sheets may essentially be fibers of glass, carbon, ceramic or aramid, or a combination of the latter.

According to one favorable aspect of the process according to the invention, this process may consist of a step where the impregnated sheets are polymerized, consisting of arranging the sheets between two flat parallel supports, where these supports are pressed against each other at ambient or high temperature for a set period of time.

According to a favorable aspect of the process according to the invention, the adhesive material may comprise more than 50% of additive.

According to one favorable aspect of the process according to the invention, this process may consist of a pre-polymerization step consisting of keeping the impregnated sheets at ambient temperature for a set period of time.

According to a favorable aspect of the process according to the invention, the adherence of sheets of adjacent laminated product to each other may be reduced by increasing the quantity of diluent in proportion to the quantity of resin in the adhesive material and/or by increasing the duration of the pre-polymerization step.

According to a favorable aspect of the process according to the invention, the process of impregnating the fiber fabric may be carried out by pulverization, by manual application using a roller, by impression of a machine of the "offset" type, or by soaking.

According to a third aspect, the invention involves peelable shims for mechanical assemblies.

Peelable shims according to the invention consist essentially of a laminated product according to the invention or obtained using the manufacturing process according to the invention.

Other characteristics and advantages of the invention will become clear from the description given below, solely as an example and which is in no way limiting, in reference to the attached drawings, in which.

Figure 1:
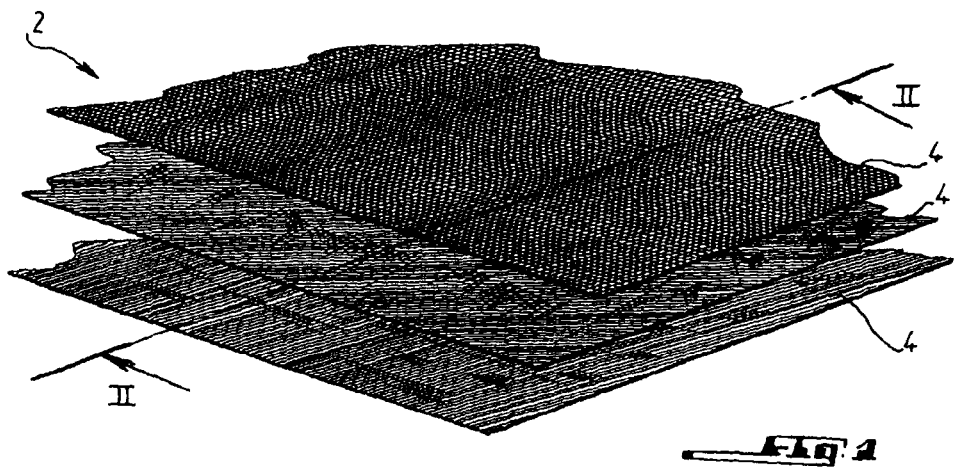
FIG. 1 is a perspective view of a laminated product according to the invention.
Figure 2:
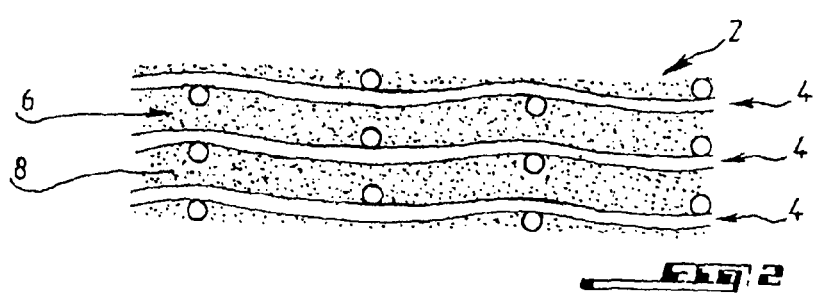
FIG. 2 is a cross-section view in the II-II plane in FIG. 1.

As shown in FIGS. 1 and 2, the invention involves a laminated product consisting of a stack (2) of sheets (4), separated by layers (6) of an adhesive material (8). Each sheet (4) has an intrinsic resistance to tearing, depending on the nature and the shape of the material or materials it consists of.

Adhesive material (8) and the thickness of each layer (6) connection the two sheets (4) adjacent to each other in stack (2) are chosen such that the connecting force uniting these two sheets is weaker than the resistance of these sheets to tearing, which results in the fact that each sheet can be removed from the stack without tearing.

According to the invention, each sheet (4) consists of fabric of woven fibers (12) that are bounded between each other by interstices (14). Fabrics (12) in each sheet (4) of each pair of sheets adjacent to the same layer (6) of adhesive material (8) are impregnated throughout their thickness with a mass of adhesive material, which is incorporated into the common layer of adhesive material at least through interstices (14) of this sheet.

Figure 3:
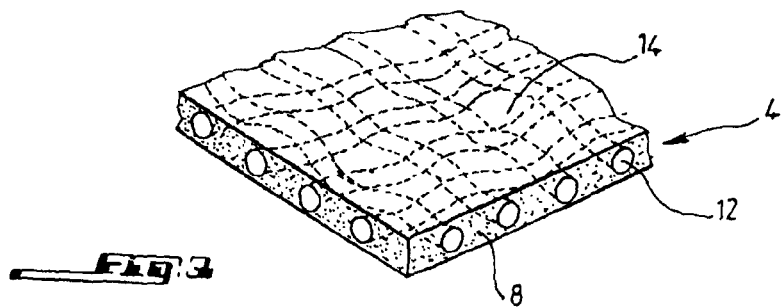
FIG. 3 is a perspective view of a fabric impregnated with laminated product in FIG. 1.
Figure 4:
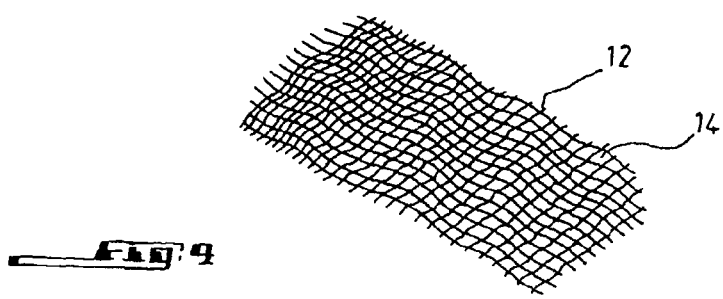
FIG. 4 is a perspective view of the fabric in FIG. 3 before impregnation.

These fabrics (12) are made of intercrossed fibers, as shown in FIGS. 3 and 4. The fibers may be of glass, carbon, ceramic or aramid, or of any other material having comparable mechanical properties. Several types of fibers may be combined in the same fabric. These fabrics are well known to the craftsman and will not be described in further detail.

Adhesive material (8) is a material that can be polymerized either by thermal treatment, or at ambient temperature. The adhesive material is for example an epoxy, phenolic, vinylester or polyvinylic resin. It should preferably be mono-constituent.

Additives are added to the resin in some cases, described later in detail. These additives are of two types. Hardeners are added to confer specific mechanical characteristics upon the rolled product, for example hardness, rigidity, or resistance in tension and compression.

The second type of additive is a diluent intended to modify the viscosity of adhesive material (8). The quantity of diluent will influence the quality of impregnation of fibrous fabric (12), as well as the adherence of sheets (4) which are adjacent to each other.

We shall now describe the preparation process of the rolled product.

Pieces of fibrous fabric (12) indicated above are first cut out and set to the desired dimensions. Each of them will constitute one sheet of laminated product after treatment.

The piece of fabric is then subjected to a process of impregnation by the adhesive material (8). One of the important aspects of the invention is to obtain a good impregnation of the fibrous fabric by the adhesive substance, i.e. an impregnation as complete as possible, by which all the fabric's fibers are completely surrounded by a matrix of adhesive material and all interstices (14) of fabric (12) are completely filled up, as can be seen in FIG. 3.

In order to achieve this result, we use a quantity of resin of between 40% and 60% of volume of the fabric (12) after impregnation.

This quantity of adhesive material (8) is considerably higher than the quantity used in laminated products in the past. In the past, the adhesive material serves only to constitute the adhesive layer that separates the two adjacent sheets (4), of a thickness of about two microns, whereas, according to the invention, it also serves to constitute the sheet itself.

Another parameter that is significant to the success of the impregnation process is the viscosity of adhesive material (8). This viscosity depends of course upon the choice of the polymerizable resin to be used, which is a function of the application anticipated for the laminated product being fabricated. The natural viscosity of the resin can be corrected by adding the diluent mentioned above. This diluent is aqueous or in solution with another solvent as a function of the selected resin.

The choice of diluent and the quantity to be added present no problem to the experienced craftsman.

The impregnation procedure is carried out by pulverization, by means of a nozzle or spray gun, by application with a manual roller, by printing with an "offset"-type machine, by soaking fabric (12) in a bath of adhesive material or by any other technique that allows satisfactory penetration of adhesive material (8) into fibrous fabric (12).

Sheets (4) of impregnated fabric are then, if necessary, kept in a cooling room at a temperature less than minus 18° C. until they are to be used. This characteristic of the invention is particularly advantageous because it allows the sheets to be mass produced. Keeping the product at the temperature indicated above allows the polymerization phenomenon in adhesive material (8) to be blocked. The storage period can reach several months without causing degradation of the laminated product's performance obtained from stored sheets (4).

Sheets (4) of impregnated fabric are then subjected to a pre-polymerization process. This process consists of keeping sheets (4) of impregnated fabric at an ambient temperature for a predetermined period of time.

Adherence of the sheets adjacent to each other in the adjacent stack, i.e. the ease with which they can be peeled, depends both on the length of the period of the pre-polymerization process and the quantity of diluent added to the adhesive material (8) in proportion to the resin.

In the absence of diluent, the laminated product obtained using sheets (4) of impregnated fabric pre-polymerized for six months is easily peelable. The laminated product obtained using sheets (4) of impregnated fabric that has been pre-polymerized for two months is of average peelability. The Laminated product obtained from sheets (4) of impregnated fabric that was not pre-polymerized is peelable only with difficulty.

The increase in the amount of diluent comes into play in the sense of a greater ease of peeling sheets (4). The introduction of a certain quantity of diluent into the adhesive material (8) will therefore allow us to obtain equivalent peelability, with shorter periods of polymerization than those that are indicated above.

We consider that, if adhesive material (8) contains more than 50% diluent by volume before impregnation, the pre-polymerization phase is no longer necessary to obtain rolled products of average peelability.

Sheets (4) of impregnated fabric are finally subjected to a final, pressurized polymerization process. This process consists of arranging sheets (4) in a stack between two flat parallel supports, where these supports are pressed against each other at ambient or high temperature for a predetermined period of time. Chemical bonds are created at the interface between the masses of adhesive material (8) that impregnate fabric (12) of adjacent sheets (4), thus creating intermediate bond layer (6) between sheet (4).

This process confers upon the laminated product the desired mechanical properties of parallelism, flatness, cohesion and peelability.

The flat supports consist of two relatively thick calibrated steel plates, for example 50 mm thick. The plates are pierced at the edges with threaded shafts or screws, on which a proportional tightening is applied with the help of a dynamometric tool. This procedure takes place at ambient temperature or in temperature-controlled drying oven.

In another manner of embodiment, the sheets are stacked and pressed in a heated press.

The duration of the polymerization procedure is a function of the type of resin used in adhesive material (8), the temperature and the quantity of diluent added. At ambient temperature, this duration ranges from several days if adhesive material (8) contains more than 50% diluent by volume, to several weeks if adhesive material (8) contains no diluent. With heating, this duration is reduced to a few hours, generally from one to three hours.

Finally the laminated product is machined or cut out if necessary to adequate dimensions.

After this last step, the piece constitutes the laminated product, ready for use.

Laminated products of this type are well adapted to serve as shims for the aeronautical industry, for example for airplanes or helicopters, these latter containing a greater and greater number of parts made of materials consisting of fiber fabrics.

It is quite evident that these laminated products can also serve as peelable shims in other fields of application, generally anywhere where characteristics of lightness and mechanical resistance are required.

It should be noted that the laminated products described above are particularly easy to peel, this peeling can be done by hand, without the use of a tool, which is not the case with metallic shims.

The invention claimed is:

1. Peelable laminated adjustment shim for compensation of play in mechanical assembly having a thickness that can be adjusted by exfoliating, comprising: an alternating stack of sheets and layers, each layer being made of an adhesive material, and being located between two sheets for bonding these sheets to each other, each sheet having a predetermined resistance to tearing, and said layer having a predetermined bonding force, the bonding force of each said layer being smaller than the resistance to tearing, so that upon application of a tearing force which is greater than the bonding force, the sheet to which the tearing force is applied is separable from an adjacent sheet, each sheet comprising fabric of woven fibers impregnated throughout its thickness with a mass of said adhesive material which is the same as the adhesive material of the layers, this adhesive material being a polymerized resin selected from the group consisting of epoxies, phenolics, vinyl-esters, polyvinylics and combinations thereof.

2. The peelable laminated adjustment shim according to claim 1, wherein additives have been added to the adhesive material wherein said additives are hardeners and/or diluents that modify the viscosity of the adhesive material.

3. The peelable laminated adjustment shim according to claim 2 wherein the additive represents more than 50% by volume of the adhesive material before the polymerization process.

4. The peelable laminated adjustment shim according to claim 1, wherein the fibers in the sheets are of at least one of glass, carbon, ceramic or aramid.

5. A mechanical assembly including the peelable laminated adjustment shim according to claim 1.

6. The peelable laminated adjustment shim according to claim 1, wherein the adhesive material represents about 40% to about 60% of the volume of the peelable laminated adjustment shim before the polymerization process.

7. The peelable laminated adjustment shim according to claim 1, wherein the adhesive material comprises additives.

8. The peelable laminated adjustment shim according to claim 7, wherein the additives consist of at least one from the group consisting of hardeners and diluents.

9. A laminated adjustment shim for compensation of play in mechanical assembly with adjustable thickness by exfoliation comprising:
an alternating stack of sheets and layers of polymerized adhesive material, each sheet being intrinsically resistant to tearing and each layer of adhesive material connecting the one to the other two adjacent sheets of the stack by a connection force that is weaker than the resistance of the sheets to tearing,
wherein each sheet can be detached from the stack without being torn,
wherein each sheet is formed of a fabric woven fibers, and
wherein each sheet comprising the fabric of woven fibers is impregnated throughout its thickness with, a mass of the adhesive material which is the same as the adhesive material of the layers, wherein the adhesive material is a polymerized resin selected from the group consisting of epoxies, phenolics, vinyl-esters, polyvinylics and combinations thereof.

* * * * *